Figure 1:
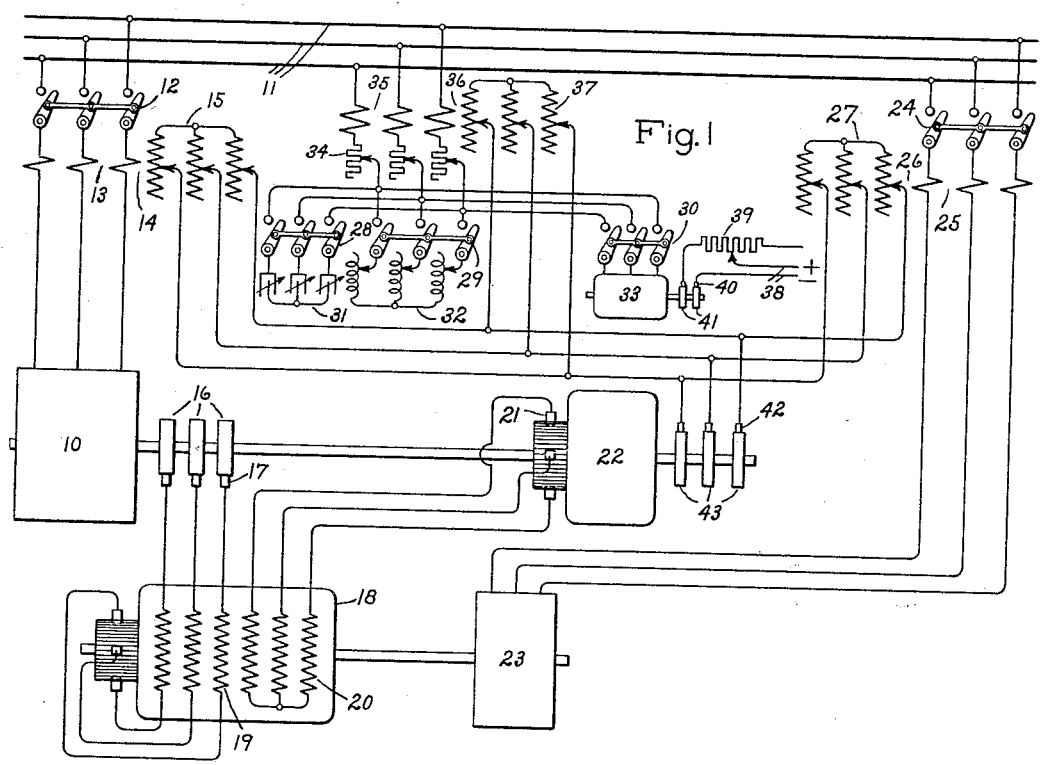

May 10, 1932.   E. REIMANN   1,858,058

SLIP REGULATION OF ASYNCHRONOUS MACHINES

Filed April 2, 1930

Inventor:
Erich Reimann,
by Charles E. Tullar
His Attorney.

Patented May 10, 1932

1,858,058

UNITED STATES PATENT OFFICE

ERICH REIMANN, OF CHARLOTTENBURG, GERMANY, ASSIGNOR TO GENERAL ELECTRIC COMPANY, A CORPORATION OF NEW YORK

SLIP REGULATION OF ASYNCHRONOUS MACHINES

Application filed April 2, 1930, Serial No. 441,022, and in Germany April 11, 1929.

My invention relates to asynchronous machines and the principal object of my invention is to provide means whereby their speed regulation may be readily adjusted to suit the varying needs of industry. An additional object of my invention is to provide simple and reliable means for controlling the speed or power factor of asynchronous machines.

It is well known to those skilled in the art that at no load the usual asynchronous motor runs slightly below its synchronous speed so that its rotor may develop the necessary torque to overcome its rotation losses and this speed is termed inherent no load speed. If for example the motor is fully loaded, its speed will decrease from its no load value so that its rotor may develop the additional necessary torque to overcome the imposed load and this speed is termed inherent full load speed. The difference between the no load and full load speeds is termed inherent speed regulation. It is often desirable to economically vary the speed of a wound secondary asynchronous motor above and below its inherent values, and it is well known to those skilled in the art that this may be accomplished by varying the magnitude and direction of the exciting current of a commutator regulating machine concatenated with the secondary, but with a definite value of exciting current the speed regulation of the motor remains at very nearly its inherent value. Where an asynchronous motor drives a rapidly varying load containing heavy rotating masses it is desirable to be able to economically operate the motor above and below its inherent speed values with a speed regulation in excess of its inherent value and which is so arranged that with increasing motor load the speed of the motor drops slowly at first and then more rapidly as higher loads are reached. This method of operation results in only a slight utilization of the kinetic energy of the rotating masses at light motor loads, but permits the kinetic energy to become available in a large measure to assist the motor in carrying the heavy loads, thus reducing the severity of the fluctuations in power input to the motor. These results could be accomplished if at some predetermined motor load the exciting current of the regulating machine was suitably varied by manual or automatic means, but it is apparent that with rapid fluctuations of motor load the manual method is entirely unpractical and the automatic method fails to accomplish the desired results due to the inertia of the devices used. To escape these disadvantages an attempt was made to secure the desired results by energizing the exciting windings by currents which are directly proportional to the motor loads. These attempts failed to produce the desired results because the speed of the motor decreased in proportion to the increased load, thus utilizing the kinetic energy in proportion to the load increase at light loads as well as at heavy loads, whereas it is desired that the kinetic energy be only slightly used with load increases at light load and be substantially used with load increases at heavy loads. It therefore became desirable to provide automatic means without moving parts that will energize the exciting windings so as to cause a low rate of motor speed decrease for increasing loads at light motor loads and a much higher rate of speed decrease for increasing loads at heavy motor loads. This desirable result is accomplished by my invention which consists of automatic means for energizing the exciting windings by currents which are approximately directly proportional to the flow of slip energy from or to the secondary of the asynchronous motor. My invention also provides means whereby this exciting current may be combined with other exciting currents having different relationships to the slip energy flow so that by varying the relative magnitudes and geometrical relationship of these exciting currents it is possible to obtain a resulting exciting current having any desired ratio to the motor load as the load is increased so as to obtain any desired rate of speed decrease with increasing load to suit the varied needs of industry.

My invention will be best understood from the following description when considered in connection with the accompanying drawings while the features of my invention which are believed to be novel and patentable are pointed out in the appended claims.

Figure 2:
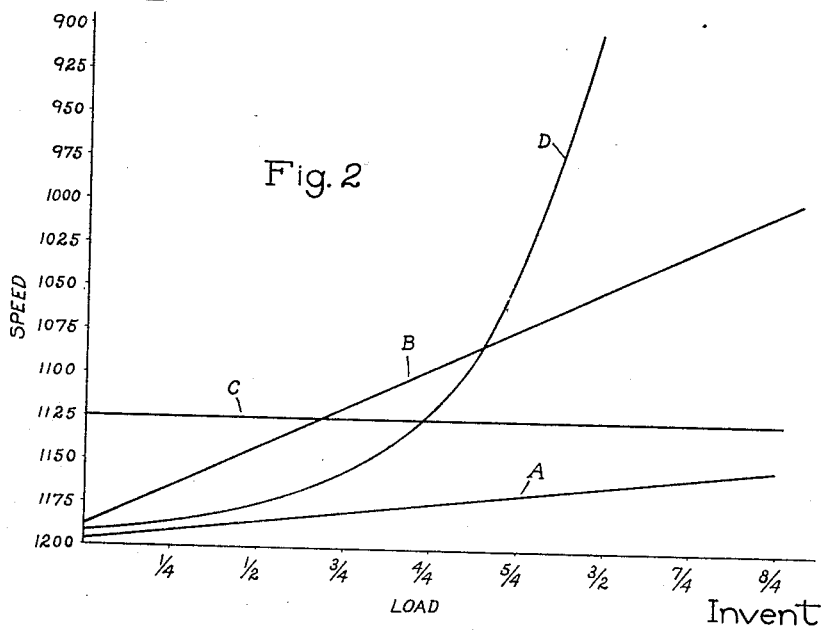

Fig. 1 represents a preferred embodiment of my invention, and Fig. 2 shows comparative curves representing the inherent speed load characteristics of the asynchronous motor and the speed load characteristics of the motor obtainable with exciting currents in the regulating machine which are substantially constant or which vary with some operating conditions of the motor.

In Fig. 1 the primary windings of the main asynchronous motor 10 which drives a load containing heavy rotating masses is connected to an alternating current source 11 through the switch 12 and the primary 13 of a current transformer 14 whose secondary is represented by 15. The motor 10 has a rotating wound secondary connected to collector rings 16 on which rest brushes 17 electrically connected to a commutator regulating machine 18 having a compensating winding 19 and an exciting winding 20 energized from the commutator brushes 21 of a commutator type frequency changer 22 driven by the motor 10. The regulating machine 18 is driven by a synchronous or asynchronous machine 23 connected to the source 11 through a switch 24 and the primary 25 of a current transformer 26 whose secondary is represented by 27. I also prefer to provide means whereby if desired the exciting winding 20 may be energized by a current component whose value is independent of the load on motor 10. This is accomplished by closing either of the switches 28, 29 or 30 which respectively connect the condenser 31, the inductance 32 or the synchronous machine 33 to the source 11 in series with the resistance 34 and the primary 35 of a current transformer 36 whose secondary is represented by 37. The synchronous machine 33 has a revolving field energized by a suitable direct current source 38 connected in series with a resistance 39 to brushes 40 resting on collector rings 41 which are connected to the field. I have represented 31, 32, 34 and 39 as variable but if desired they may have fixed values. The number of turns in the secondaries 15, 27 and 37 may be fixed or variable but I have illustrated the latter, and these secondaries are connected in parallel to brushes 42 which rest on the collector rings 43 of the frequency changer 22.

The frequency changer 22 being directly driven by motor 10 will have the same number of poles as the motor 10, hence the frequency of the currents of the secondaries 15, 27 and 37 will be transformed from that of the source 11 to the same frequency as the currents in the wound secondary. It follows that the exciting winding 20 will be energized by a current having the same frequency as the current in the wound secondary but its magnitude will be directly proportional to the vector sum of the currents flowing in the secondaries 15, 27 and 37 and, therefore, the voltage of the regulating machine 18 which is impressed on the collector rings 16 will be substantially directly proportional to the vector sum of the currents flowing in the secondaries 15, 27 and 37 and will have the same frequency as the voltage induced in the wound secondary.

To assist the description of the invention I will assume that the motor 10 has a synchronous speed of 1200 R. P. M. and it is to operate below synchronism, but it will be readily apparent that my invention is applicable to a motor having any synchronous speed and operating either above or below synchronism, or both above and below synchronism. If the exciting winding 20 is not energized the motor 10 will run at very nearly its inherent speeds and if the motor 10 has a high overload capacity its inherent speed load characteristics may be represented by a substantially straight line as shown for example by curve A in Fig. 2, and as shown the no load speed is slightly below 1200 R. P. M. to allow the wound secondary to develop the necessary torque to overcome its rotation losses. It is apparent that this method of operation will not utilize the kinetic energy of the rotating masses in the desired manner because the motor 10 has a relatively small speed drop from no load to overload, and furthermore the speed drop is practically directly proportional to the load increase, thus utilizing proportional parts of the kinetic energy as the load is increased. If the exciting winding is energized by a current which is directly proportional to the current in the secondary 15 the speed of the motor 10 will decrease an additional amount besides its inherent speed decrease, and this additional speed decrease will be approximately directly proportional to the load increase of motor 10 and may for example be represented by curve B in Fig. 2. The actual speed load characteristics of the motor 10 will then be represented by the combination of curves A and B. By varying the number of turns in the secondary 15 the slope of the curve B can be changed but it will remain a substantially straight line and hence the combintaion of curves A and B will remain a substantially straight line. It is apparent that as compared to operation under curve A the operation under combined curves A and B makes a greater utilization of the kinetic energy of the rotating masses but it does not produce the desired results because the speed decrease is practically directly proportional to the load increase, thus utilizing proportional parts of the kinetic energy as the load is increased. As the current in the primary 35 does not vary with any operating condition of the motor 10, therefore if the exciting winding is energized by a current which is directly proportional to the current in 37, the speed of the motor 10 will be decreased an additional amount besides its inherent speed decrease and this additional speed decrease will be a practically constant amount irrespective of the load and may for example be represented by curve C in Fig. 2. By varying the number of turns in the secondary 37 the magnitude of the speed decrease can be changed but it will remain at a substantially constant value at all loads and it is therefore apparent that the resulting speed load characteristics of the motor 10 will be a straight line since it is represented by the combination of curves A and C, hence this method of operation will not produce the desired results. It should be evident that if the exciting winding 20 is energized by a current which is directly proportional to the vector resultant of the currents flowing in secondaries 15 and 37 the resulting speed load characteristics of the motor wll be represented by a substantially straight line since it is the combination of curves A, B and C, hence the desired operating results will not be obtained because there is a utilization of proportional parts of the kinetic energy with increasing load. It is therefore evident that to produce the desired results the speed load characteristics should be represented by a parabolic curve as shown for example by curve D in Fig. 2. These speed load characteristics are produced by my invention which energizes the exciting winding by a current which is substantially directly proportional to the flow of slip energy from or to the wound secondary. If winding 20 is so energized that 18 injects a voltage into the secondary opposing the secondary voltage, the speed of the motor 10 decreases below its inherent value because the voltage of 18 has the equivalent action of a resistance inserted in the secondary circuit. It follows that 18 runs as a motor driving 23 as a generator which returns to the source 11 all the surplus slip energy induced in the secondary due to its lower speed and consequent higher voltage less the operating losses of 18 and 23. If winding 20 is so energized that 18 injects a voltage into the secondary so as to aid the secondary voltage, the speed of the motor 10 rises above its inherent value since part of the slip energy is supplied by 18 which now acts as a generator driven by 23 as a motor, therefore causing a flow of power from 11 to 23 through the primary 25 equal to the slip energy supplied by 18 plus the operating losses of 18 and 23. At synchronous speed all the slip energy is supplied by 18 and above synchronous speed the secondary voltage has the equivalent action of a resistance inserted in the secondary circuit, thus consuming the increased flow of slip energy from 18 due to its higher voltage. It follows that disregarding the operating losses of 18 and 23 the current flow in the primary 25 and hence the current flow in the secondary 27 increases in substantially direct proportion to the flow of slip energy from or to the wound secondary of 10 and this is substantially directly proportional to the speed variation below or above the inherent speed of the wound secondary.

Assuming operation below synchronism, an increased current in secondary 27 lowers the speed of 10 and causes an increase in the slip energy flowing from the secondary, thus again increasing the current in the secondary 27 which again increases the slip energy flow, etc. With operation above synchronism the same is true except that the speed of 10 will increase. This cumulative action causes a speed load characteristic as represented by the parabolic curve D, the shape of which is determined by the following considerations. The current in the primary 25 is not strictly proportional to the flow of slip energy from or to the secondary of 10 due to the operating losses of 18 and 23 and hence this variation from proportionality is greatest at light loads. By varying the power factor of 23 this variation in proportionality may be altered. The current in winding 20 is not strictly proportional to the current in the secondary 27 due to variations in the impedance of 20 with changing slip frequency and hence the speed of 10 is not strictly proportional to the current in 27. By varying the ratio of reactance to resistance in 20, this variation in proportionality may be altered. The control of these variations in proportionality together with control of the ratio of turns in 25 and 27 gives control of the cumulative action referred to and thus controls the shape of the curve D so that in combination with the curve A the desired operating results will be obtained for most industrial needs. When desired, the motor 10 may be operated with the winding 20 energized by the vector sum of the currents flowing in the secondaries 27 and 37, or secondaries 27 and 15, or secondaries 27, 37 and 15, and the variation of the comparative magnitudes and geometrical relationships of these secondary currents results in a flexible control of the resulting secondary current fed to the rings 43 as the load of motor 10 is increased, thereby giving a flexible control of the shape of the speed load curve of the motor 10 to suit the varying needs of a particular installation or industry in general.

The transformer 36 may be used solely to give the speed load curve C by suitably adjusting the value of 34 to the value of 31 or 32 when operating with 31 or 32 respectively, or by suitably adjusting 39 when operating with 33, so that in any case the current in the secondary 37 will be in phase with the currents of the other transformer secondaries. If desired, the transformer 36 may be used substantially for controlling the power factor only of the motor 10 by having a zero value of 34 and suitably adjusting 31 or 32 when using 31 or 32 respectively and which should then have high ratios of reactance to resistance, or when operating with 33 by suitably adjusting 39 so as to over-excite or under-excite the field of 33. It is apparent that it is possible to use the transformer 36 with the control apparatus connected thereto for varying the speed or the power factor, or both, of the motor irrespective of the nature of the load it drives. It is apparent that irrespective of the use made of the transformer 36 it will be best to operate it with the synchonous machine 33 as this combines into one machine the ability to produce and smoothly control either a lagging or leading current for power factor control of the motor 10.

I have described my invention in connection with an asynchronous machine having a rotatable wound secondary and operating below synchronism with a commutator type frequency changer, but it is evident that my invention is applicable to any drive in which slip energy flows from or to the secondary of the asynchronous machine irrespective of its operation above or below synchronism or the frequency changing means used, and irrespective of whether the asynchronous machine has a rotating or stationary wound secondary or whether used as a motor or as a generator. Accordingly I wish it understood that the embodiment shown is only illustrative of the principles of my invention and that such other modifications as come within its true spirit and scope are intened to be included in the scope of the appended claims.

What I claim as new and desire to secure by Letters Patent of the United States, is:

1. In combination, a source of alternating current, a wound secondary asynchronous machine having its primary winding connected to said source, a commutator regulating machine concatenated with the secondary winding of the said asynchronous machine, an exciting winding for said regulating machine, a dynamo electric machine mechanically connected to the said commutator machine, said dynamo electric machine having its primary winding connected to said source, and means for energizing said exciting winding with a current whose frequency is the same as the frequency of the currents flowing in said secondary and whose magnitude is approximately directly proportional to the vector sum of the currents flowing in the primary windings of said asynchronous machine and said dynamo electric machine.

2. In combination, a source of alternating current, a wound secondary asynchronous machine having its primary winding connected to said source, a commutator regulating machine concatenated with the secondary winding of the said asynchronous machine, an exciting winding for said regulating machine, a dynamo electric machine mechanically connected to the said commutator machine, said dynamo electric machine having its primary winding connected to said source, current consuming means connected to said source and adapted to be energized from said source with a current whose magnitude is substantially directly proportional to the voltage of said source, and means for energizing said exciting winding with a current whose frequency is the same as the frequency of the current flowing in said secondary and whose magnitude is approximately directly proportional to the vector sum of the current flowing in the primary winding of said dynamo electric machine and the current flowing from said source into said current consuming means.

3. In combination, a source of alternating current, a wound secondary asynchronous machine having its primary winding connected to said source, a commutator regulating machine concatenated with the secondary winding of the said asynchronous machine, an exciting winding for said regulating machine, a dynamo electric machine mechanically connected to the said commutator machine, said dynamo electric machine having its primary winding connected to said source, current consuming means connected to said source and adapted to be energized from said source with a current which is substantially directly proportional to the voltage of said source, and means for energizing said exciting winding with a current whose frequency is the same as the frequency of the currents flowing in said secondary and whose magnitude is approximately directly proportional to the vector sum of the current flowing in the primary winding of said asynchronous machine and the current flowing in the primary winding of said dynamo electric machine and the current flowing from said source into said current consuming means.

4. In combination, an alternating current asynchronous machine having a primary winding and a wound secondary, frequency changing means, a suitable source of alternating current connected to said primary winding, a commutator machine electrically connected to said secondary, an exciting winding for said commutator machine energized by said frequency changing means, an alternating current dynamo electric machine mechanically connected to said commutator machine, said dynamo electric machine having its primary winding connected to said source, current transforming means having their primary windings respectively connected in series with the primary windings of said asynchronous and dynamo electric machines, and connecting means between the secondary windings of said current transforming means and said frequency changing means for energizing the latter with a current whose magnitude is approximately directly proportional to the vector sum of the currents flowing in the primary windings of said current transforming means.

5. In combination, an alternating current asynchronous machine having a primary winding and a wound secondary, frequency changing means, a suitable source of alternating current connected to said primary winding, a commutator machine electrically connected to said secondary, an exciting winding in said commutator machine energized by said frequency changing means, an alternating current dynamo electric machine mechanically connected to said commutator machine, said dynamo electric machine having its primary winding connected to said source, current consuming means connected to said source and adapted to be energized from said source with a current whose magnitude is substantially directly proportional to the voltage of said source, current transforming means having its primary winding connected in series with the primary winding of said dynamo electric machine, current transforming means having its primary winding connected in series with said current consuming means, and connecting means between the secondary windings of the said current transforming means and said frequency changing means for energizing the latter with a current whose magnitude is approximately directly proportional to the vector sum of the currents flowing in the primary windings of the said current transforming means.

6. In combination, an alternating current asynchronous machine having a primary winding and a wound secondary, frequency changing means, a suitable source of alternating current connected to said primary winding, a commutator machine electrically connected to said secondary, an exciting winding in said commutator machine energized by said frequency changing means, an alternating current dynamo electric machine mechanically connected to said commutator machine, said dynamo electric machine having its primary winding connected to said source, current consuming means connected to said source, and adapted to be energized from said source with a current whose magnitude is substantially directly proportional to the voltage of said source, current transforming means having their primary windings respectively connected in series with the primary windings of said asynchronous and dynamo electric machines, current transforming means having its primary winding connected in series with said current consuming means, and connecting means between the secondary windings of the said current transforming means and said frequency changing means for energizing the latter with a current whose magnitude is approximately directly proportional to the vector sum of the currents flowing in the primary windings of the said current transforming means.

7. In combination, an alternating current asynchronous machine having a primary winding and a wound secondary, a regulating system therefor comprising a commutator type frequency changer driven by said asynchronous machine, said frequency changer having a winding connected to collector rings, a suitable source of alternating current connected to said primary winding, a commutator machine electrically connected to said secondary, an exciting winding in said commutator machine connected to the commutator of said frequency changer, an alternating current dynamo electric machine mechanically connected to said commutator machine and having its primary winding connected to said source, and a current transformer having its primary winding in series with the primary winding of the said dynamo electric machine and its secondary winding connected to the collector rings of said frequency changer.

8. In combination, an alternating current asynchronous machine having a primary winding and a wound secondary, a speed and power factor regulating system therefor comprising frequency changing means, a suitable source of alternating current connected to said primary winding, a commutator machine electrically connected to said secondary, an exciting winding in said commutator machine energized by the said frequency changing means, an alternating current dynamo electric machine mechanically connected to said commutator machine and having its primary windings connected to said source, current transforming means having its primary winding connected in series with the primary winding of the said dynamo electric machine, current transforming means having its primary winding connected to said source, means to vary the phase angle between the voltage and the current in the primary winding of the last mentioned current transforming means, and connecting means between the secondaries of the said current transforming means and said frequency changing means for energizing the latter with a current whose magnitude is approximately directly proportional to the vector sum of the currents flowing in the primary windings of said current transforming means.

9. In combination, an alternating current asynchronous machine having a primary winding and a wound secondary, a speed and power regulating system therefor comprising frequency changing means, a suitable source of alternating current connected to said primary winding, a commutator machine electrically connected to said secondary, an exciting winding assembled in said commutator machine energized by said frequency changing means, an alternating current dynamo electric machine mechanically connected to said commutator machine and having its primary winding connected to said source, current transforming means having its primary winding connected in series with the primary widing of the said dynamo electric machine, current transforming means having its primary winding connected to said source, a synchronous machine having its primary winding connected in series with the primary winding of the last mentioned current transforming means, said synchronous machine having a field winding, means for adjustably energizing said field winding and connecting means between the secondaries of the said current transforming means and said frequency changing means.

10. In combination, a source of alternating current, a wound secondary asynchronous machine having its primary winding connected to said source, a commutator machine having an exciting winding, connecting means for impressing on said secondary a voltage whose magnitude is substantially directly proportional to the voltage of said commutator machine, frequency changing means for energizing said exciting winding, an alternating current dynamo electric machine mechanically connected to said commutator machine and having its primary winding connected to said source, and means for energizing said frequency changing means with a current whose magnitude is substantially directly proportional to the current flowing in the primary winding of said dynamo electric machine.

In witness whereof I have hereunto set my hand this 8 day of March 1930.

ERICH REIMANN.